US007640153B2

(12) United States Patent
Bala et al.

(10) Patent No.: US 7,640,153 B2
(45) Date of Patent: Dec. 29, 2009

(54) NETWORKED CLIENT-SERVER ARCHITECTURE FOR TRANSPARENTLY TRANSFORMING AND EXECUTING APPLICATIONS

(75) Inventors: Vasanth Bala, Sudbury, MA (US); Paolo Faraboschi, Brighton, MA (US); Giuseppe Desoli, Watertown, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1426 days.

(21) Appl. No.: 09/874,170

(22) Filed: Jun. 4, 2001

(65) Prior Publication Data

US 2002/0184618 A1    Dec. 5, 2002

(51) Int. Cl.
G06F 9/44     (2006.01)
G06F 9/45     (2006.01)
G06F 9/455    (2006.01)

(52) U.S. Cl. .................. 703/20; 703/22; 703/26; 709/202

(58) Field of Classification Search .................. 703/22, 703/20, 26; 709/202
See application file for complete search history.

(56) References Cited

U.S. PATENT DOCUMENTS

| 5,339,422 | A | * | 8/1994 | Brender et al. .................. 714/4 |
| 5,613,098 | A | * | 3/1997 | Landau et al. ................. 703/20 |
| 5,931,900 | A | * | 8/1999 | Notani et al. ................. 709/201 |
| 6,000,028 | A | * | 12/1999 | Chernoff et al. ............. 712/226 |
| 6,026,238 | A | * | 2/2000 | Bond et al. .................. 717/141 |
| 6,370,687 | B1 |  | 4/2002 | Shimura |

FOREIGN PATENT DOCUMENTS

JP    2000 215181 A    8/2000

OTHER PUBLICATIONS

"Product Brief: Alpha 21164 Microprocessor", Jan. 1999, Digital/Compaq Corporation, pp. 1-2.*
Sirer, Grimm, Bershad, Gregory, and McDirmid; "Distributed Virtual Machines: A System Architecture for Network Computing"; Feb. 1998; Dept. of Computer Science & Engineering, University of Washington, pp. 1-4.*
Hennessy and Patterson, "Computer Architecture: A Quantitative Approach"; 2003; Morgan Kaufmann Publishers; pp. 392-406.*
Bellas, Hajj, and Polychronopoulos; "Using Dynamic Cache Management Techniques to Reduce Energy in General Purpose Processors"; Dec. 2000; IEEE Transactions on Very Large Scale Integration (VLSI)Systems; vol. 8, No. 6; pp. 693-702.*

(Continued)

Primary Examiner—Jason Proctor

(57) ABSTRACT

The present invention provides for native execution of an application on a client using code segments transmitted from a server over a network. The server includes an application code source, and a server code segment manager. The server may also include an application code transformation manager if the code source is not in the native binary format of the client. The client includes a client code segment manager, a code cache linker and manager, a code cache, and a CPU. When the client seeks to execute an application, code segments are transmitted from the server to the client and are stored in the code cache. The CPU then executes the code segments natively. When a code segment branches to a segment not in the cache, control passes to the client code segment manager, which requests the needed code segment from the server code segment manager of the server.

23 Claims, 7 Drawing Sheets

OTHER PUBLICATIONS

Microsoft Computer Dictionary, 2002, Microsoft Press, "cross-compiler".*

Bill Venners, Java's garbage-collected heap, Aug. 1996, retrieved on May 3, 2005 from http://www.javaworld.com.*

Abraham Silberschatz and Peter Baer Galvin, "Operating System Concepts", 1999, John Wiley & Sons Inc., Fifth Edition, pp. 239-243.*

V. Bala, et al., Transparent Dynamic Optimization, HP Laboratories Cambridge, Jun. 1999, pp. 1-17.

A. Klaiber, The Technology Behind Crusoe™ Processors, Transmeta Corp., Jan. 2000, pp. 1-18.

V. Bala, et al., Dynamo: A Transparent Dynamic Optimization System, HP Laboratories Cambridge, pp. 1-12.

V. Bala, et al., Transparent Dynamic Optimization: The Design and Implementation of Dynamo, Jun. 1999, HP Laboratories Cambridge, pp. 1-102.

Cardelli, Luca, "Program Fragments, Linking, And Modularization", Jan. 15, 1995, Digital Equipment Corp., System Research Center, pp. 266-277.

Sheng Liang et al., "Dynamic Class Loading in the Java Virtual Machine", Oct. 1998, Sun Microsystems Inc., pp. 36-44.

* cited by examiner

NETWORKED CLIENT-SERVER ARCHITECTURE FOR TRANSPARENTLY TRANSFORMING AND EXECUTING APPLICATIONS

FIELD OF THE INVENTION

The present invention relates to the execution of applications in a client-server environment. More specifically, the present invention relates to a client-server architecture wherein an application resides on a server, and portions of the application are transformed by the server into a native code executable by a client, and transmitted to, cached in, and executed by the client.

DESCRIPTION OF THE RELATED ART

In the art of computing, servers and clients coupled by a network often cooperate to execute applications. There are many models known in the art that facilitate the execution of applications in this way. For example, it has long been known to use a file server to store data and applications. A client seeking to execute applications using this model simply accesses files on the server in a manner similar to the way files are accessed on a local hard drive of the client. Additionally, it has long been known to use interprocess communication to link distributed applications, such as a database application executing on a server and a client application executing on a client. These models have traditionally been popular in private high-bandwidth networked configurations, such as an Ethernet network that couples clients and servers in a medium size business. In such environments, problems associated with computing platform diversity and security are manageable.

Unfortunately, these models have proven to be impractical when used in larger, more diverse networks, such as the Internet. One problem is bandwidth. Many clients are coupled to the Internet using relatively slow methods, such as dial-up modems. Even high speed connections, such as digital subscriber lines (DSL) and cable modems are typically one or two orders of magnitude slower than an Ethernet connection.

Another problem is security. Millions of computers are coupled to the Internet, and malicious attempts to break into clients and servers are common. Furthermore, software piracy is often a concern. If an application is available on the Internet, it becomes difficult for a vendor to control the distribution of the application. Finally, the types of devices coupled to the Internet are very diverse. Not only are there many types of computing platforms coupled to the Internet, but many types of Internet-enabled net appliances are becoming popular. As one can imagine, the problems associated with managing the execution of an application over the Internet (or other large networks) using servers and clients are daunting.

Three popular models have evolved to address these problems. These models will be referred to herein as the server execution model, the download and instal model, and the virtual machine model. In the server execution model, the application code remains resident on the server, and is executed on the server. One example of an application adhering to the server execution model is Quicken TurboTax® for the Web, which is a product of Intuit Inc. A user of this application accesses the TurboTax web site using a browser, such as Internet Explorer, which is a product of Microsoft Corporation, or Netscape®, which is a product of Netscape Communications. TurboTax for the Web is an interactive online tax preparation tool using software that remains on a secure web site. Unlike software products purchased in a retail store and installed on a computer, TurboTax for the Web works without downloading any software onto a computer. As a user of the application answers questions, the data is stored on a server, and the server performs all the operations necessary to prepare the user's tax forms.

The server execution model has many advantages. First, it is very easy for the vendor to maintain the application, since the application can be updated on the server at any time. Also, this model provides excellent security and is resistant to software piracy, since the application code is never transmitted to the client. Finally, this model provides client-platform independence since all the client needs is a web browser capable of interacting with the server.

Unfortunately, the server execution model suffers from several disadvantages. All user data must be stored on the server, which increases the amount storage resources required by the server. In addition, some users may feel uncomfortable having personal information stored on a vendor's server. Also, depending on the application, this model may require a large amount of bandwidth. For example, if a spreadsheet application were implemented using a server execution model, and if a user attempted to create a graph of the spreadsheet data, the graphic data must be transmitted to the client, which could be time consuming. Furthermore, a reliable connection must exist between the server and client at all times. Finally, and perhaps most importantly, this model has poor scalability. As additional clients attempt to access the application, the server must execute the application for each client.

Perhaps the most common model is the download and install model. In this model, applications are stored on the server, and are downloaded and installed on the client. Traditionally, the server maintains a separate version of the application for each type of client platform. For example, if a user wishes to install an application, such as Netscape, the user accesses a web site maintained by Netscape Communications and downloads the version of the application designed to operate with the user's computer system into a directory, and installs the application. Application plug-ins also adhere to the download and install model. For example, if a user attempts to play an audio file encoded for use with RealPlayer®, which is a product of RealNetworks, Inc., using Internet Explorer, the user will be directed to a web site that downloads and installs the RealPlayer plug-in into Internet Explorer.

The download and install model can also be automated to a certain extent. For example, recent versions of Windows® operating systems, which are products of Microsoft Corporation, include an automatic update feature that automatically checks a Microsoft website for updates to the operating system. If an update is found, the user is given the option to download and install the update.

One advantage of the download and install model is that it is highly scalable and a connection between the client and server is not required to execute the application. Once the application is downloaded and installed, the client provides the storage and execution resources, and no further interaction with the server is required. Accordingly, many clients can access the application without requiring additional server resources. Of course, this advantage provides several disadvantages. For example, the application is stored on the client a persistent form, thus exposing the application to software piracy and weakening the applicability of pay-per-use business models.

Also, the burden of software management is pushed to the user. Updating applications, installing patches, and releasing resources by uninstalling old unneeded applications are complex tasks, and it is desirable to avoid these tasks at the client. For example, many Internet users are familiar with the problems associated with clicking on a link that requires a certain plug-in, and discovering that the version of the plug-in currently installed on the user's computer is out of date.

The download and install model also requires a large amount of storage resources on the client, since the client must store all downloaded applications. This can be a barrier for clients having limited resources, like embedded, portable, or mobile systems.

The virtual machine model addresses some of the limitations of the download and install model. One popular technology adhering to the virtual machine model is Java®, which is a trademark of Sun Microsystems, Inc. Consider a user that wishes to access a Java application from a web browser. References to the Java application may be embedded in a web page. When the user clicks on a link to invoke the Java application, the application is transparently and securely downloaded to the user's computer. The application is then processed by a Java virtual machine, which is built into the web browser. The virtual machine typically performs a series of security checks, and then executes the application by interpreting the Java code to convert this code into native instructions that are executed by the central processing unit (CPU) of the user's client computer. The virtual machine serves as consistent interface on different kinds of computers and operating systems so that the same Java applet runs in browsers on IBM-compatible PCs, Macintoshes, UNIX® workstations, network computers, and other devices. The performance of virtual machine code can be enhanced by using a "just-in-time" (JIT) compiler. The JIT compiler compiles the virtual machine code into native code that executes on the user's client computer more efficiently than interpreted code.

The virtual machine model is platform independent. Accordingly, a properly written application can operate on any platform having an interpreter or a JIT compiler. In addition, the burden of managing the application can be easily transferred from the user to the application vendor, since the application can be downloaded (or a cached copy can be verified) whenever the application is accessed on the server. In addition, virtual machine model applications tend to be more resistant to software piracy. However, piracy is still an issue because the virtual machine code is transferred to the client. While the virtual machine model is more scalable than the server execution model because execution occurs on the client, it is less scalable than the download and install model because the virtual machine model application is typically accessed on the server every time it is executed. Also note that a reliable connection between the server and client may or may not be required based on how a virtual machine model application is implemented.

The virtual machine model still has several drawbacks. For example, many applications are not available in a virtual machine format. Also, the acceptance of Java in some domains, such as embedded devices, is still an open issue. In addition, virtual machines always introduce some performance overhead (either interpretation of compilation), which can be unacceptable in some cases. Finally, the virtual machine model does not support legacy code applications, which are typically coded for native execution on a specific computer platform.

Virtual machine interpreters also use a non-significant amount of resources in the client. For example, a typical Java virtual machine can require 300 to 1000 kilobytes of persistent storage, which can comprise a significant portion of the memory available for storing code in an embedded device. Note that a typical embedded device may only have 8 to 16 megabytes of memory. Furthermore, JIT compilers typically require significantly larger amounts of persistent storage.

As can be seen from the discussion above, none of these models provide a completely acceptable solution to the problems associated with a client and server cooperating to execute an application. What is needed in the art is a single model that combines the software piracy, client storage requirement, application code maintenance, and platform-independence attributes of the server execution model, the scalability, legacy code support, and performance attributes of the download and install model, the client-server connection attributes of the download and install model, and the scalability, application code maintenance, platform-independence attributes of the virtual machine model.

SUMMARY OF THE INVENTION

The present invention is a client-server architecture wherein an application resides on the server. When a client first seeks to execute the application, the server transmits native binary code segments to the client via a network connection. The client caches the segments in a code cache and executes the segments natively from the cache.

The server includes an application code source and a server code segment manager. The server may also include an application code transformation manager if the application code source is not in the native binary format of the client. The application code transformation manager compiles or transforms the application source into the native binary format required by the client. The server can be any type of server known in the art, such as a file server or a web server.

The client can be any type of client known in the art, such as a computer workstation, an embedded device, a net appliance, a personal digital assistant (PDA), a cellular telephone, or a peripheral device. The client includes a client code segment manager, a code cache linker and manager, a code cache, and a central processing unit (CPU). The network can represent any type of network known in the art, such as a private Ethernet network or the Internet.

The server code segment manager is responsible for providing binary code segments derived from the application code source to the client via the network. Within the client, when an application is launched, the client code segment manager requests the code segment from the server code manager of the server. The client receives the code segment, and passes the code segment to the code cache linker and manager. The code cache linker and manager links the code segment with any other segments stored in the code cache, and emits the segment into the code cache. After the segment is emitted into the code cache, control passes to the entry point of the code segment in the code cache, and the client CPU begins executing the code segment.

The code segments in the code cache are executed natively by the client's CPU until a branch is taken to a code segment not in the code cache. At this point, control passes back to the client code segment manager, which requests the code segment containing the branch target address from the server. The server then transmits the needed code segment to the client, the code cache linker and manager links the newly received code segment into the code cache, and the client's CPU continues execution with the newly received code segment in the code segment. This process continues until the application has finished execution.

The present invention combines the best attributes of prior art client-server execution models in a single execution model. Specifically, the present invention is highly scalable since execution occurs on the client. In addition, since execution occurs on the client using native binary code segments stored in a code cache, the present invention is potentially much faster than prior art virtual machine (VM) interpreters. However, since the application resides on the server, the user is relived of the burden of application management.

The present invention can operate with any type of client CPU. Furthermore, applications can exist on the server in a variety of code source formats, such as a native binary format, a source code text format of a programming language, or a VM code format, thereby allowing the present invention to support legacy applications as well as current and future applications. Accordingly, the present invention is well positioned to provide a valuable client-server execution model capable of working with an ever increasing array of CPU instruction sets and application code formats.

DETAILED DESCRIPTION OF THE PREFERRED EMBODIMENTS

Figure 1:
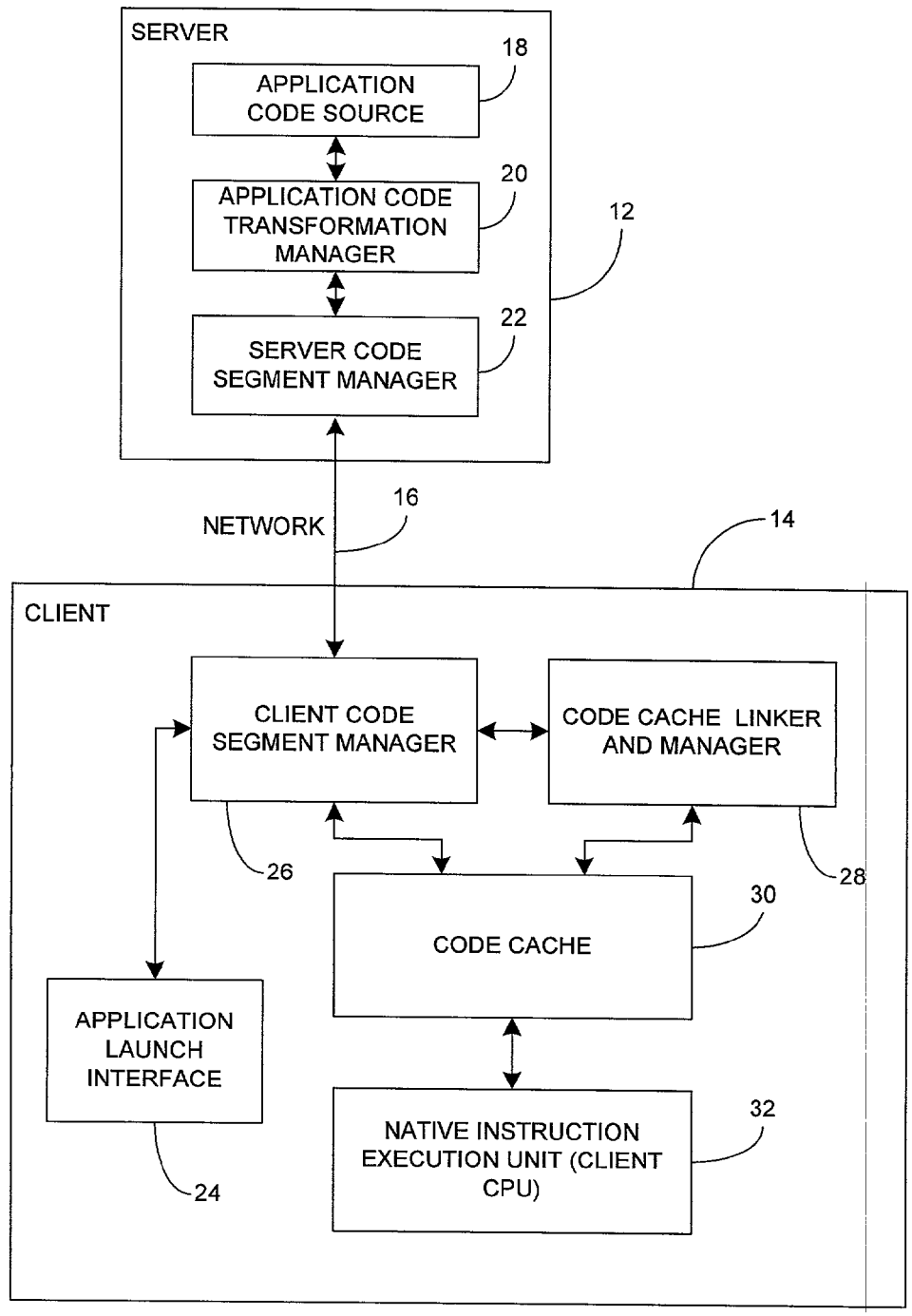
FIG. 1 is a simplified block diagram that illustrates a client and a server coupled by a network, in accordance with the present invention.

The present invention is a client-server architecture wherein an application resides on the server. When a client first seeks to execute the application, the server transmits native binary code segments to the client, which caches the segments in a code cache and executes the segments natively from the cache. The application source can be provided on the server in a variety of formats, such as a source code text format of a programming language, a native binary code format, or a virtual machine format. If the application source on the server is not in the native binary format of the client, then the server transforms the source into the native binary format required by the client. After the application begins executing on the client, when the application attempts to branch to a code segment that has not been cached, the client requests the code segment from the server, and the server transmits one or more additional code segments. The granularity of the code segments can be easily adjusted to balance server-sidle and client-side execution and network bandwidth efficiency, and client-side storage requirements.

The present invention encompasses several configurations for managing segments on the client. In one configuration, all segments comprising the application can be transmitted to the client and locked in the client's cache. This configuration would be desirable, for example, in a personal digital assistant (PDA) having a cellular link to the Internet. Imagine that a user of such a device was about to board an airplane. Before boarding the plane, the user could select an application (such as a game) that the user desired to use while in flight, and the application would be transmitted to the client via the cellular link and locked in the client's cache. After the airplane departs, the user would be able to execute the application while in flight without using the cellular link. After the airplane lands and the PDA reestablishes the cellular link, the segments in the client's code cache can be unlocked and become eligible for replacement, In other configurations, only a subset of the segments comprising the application are transmitted to the client. For example, imagine an automotive embedded device having a cellular link to the Internet. Such a device may provide access to a variety of applications, such as online maps and directions, maintenance and status reporting to the manufacturer, email, or games and other types of entertainment for the passengers. One of the characteristics of a cellular link to a client in an automobile is that as the automobile is traveling, the link maybe lost for periods of time as the automobile travels through tunnels, around mountains or other obstructions, or out of range of a cellular transmitter. Accordingly, it may be desirable to only lock portions of the application in the client's code cache. For example, assume that the user is executing an on-line map application that provides directions to a destination. The client can request all segments required to direct the user to the destination, as well as all map data needed between the user's current location and the destination. Should the automobile lose the cellular link while traveling to the destination, the application can continue to execute until the automobile reaches the destination.

Finally, for clients having a persistent and reliable connection to the server, such as a computer workstation coupled to the Internet via a DSL line or a cable modem, it is not necessary to lock any of the segments in the cache. In configurations where the complete application is not present within the client, the present invention is highly resistant to software piracy, and is therefore ideally suited for pay-per-use business models. While copying the application may not be theoretically impossible, it would be very difficult because one attempting to capture the application would need to ensure that server transmits every segment, and then the segments would have to be extracted from the client's code cache and reconstructed into an executable application. Even in configurations where the all segments have been cached in the client, it is still possible to frustrate piracy by using other techniques, such as encryption keys and expiration codes. Finally, extracting disjointed segments from the client's code cache, which will typically contain segments from other application in a relatively random pool of segments, is much more difficult than copying a contiguous prior art application from a region of memory or a hard disk drive.

Another advantage of the present invention is that since the application resides on the server, the user is relived of the burden of application management. Also, since the code is executed by the client and not the server, the present invention is highly scalable. Embedded processors continue to become more powerful, and the present invention is well suited to exploit this trend in the art. While the server must still transmit segments to each client, caching the segments in the client minimizes this burden. In addition, by caching the segments in the client, the present invention is ideally suited for use with intermittent network connections, such as a cellular link between the Internet and a mobile client.

As will be seen below, the present invention can be adapted to support the execution of a wide variety of code formats on a wide variety of platforms, thereby allowing the present invention to provide platform-independent execution. Accordingly, the present invention combines the best attributes of the server execution model, the download and install model, and the virtual machine model, which are discussed above.

FIG. 1 is a simplified block diagram that illustrates a client-server configuration 10 in accordance with the present invention. Configuration 10 includes a server 12 and a client 14, which are coupled together by network 16. Server 10 can be any type of server known in the art, such as a file server or a web server, and includes application code source 18, application code transformation manager 20, and server code segment manager 22. Client 14 can be any type of client known in the art, such as a computer workstation, an embedded device, a net appliance, a personal digital assistant (PDA), a cellular telephone, or a peripheral device. Client 14 includes application launch interface 24, client code segment manager 26, code cache linker and manager 28, code cache 30, and native instruction execution unit 32, which will typically be the client's central processing unit (CPU). Network 16 can represent any type of network known in the art, such as a private Ethernet network or the Internet.

Within server 12, block 18 represents the application code source. As mentioned above, and as will be discussed in greater detail below, application code source 18 can be provided in a variety of formats, such as source code text format of a programming language, compiled binary code, or virtual machine code.

Application code transformation manager 20 is coupled to application code source 18 and is responsible for transforming segments of application code source 16 into binary code segments that can be executed natively by the client. If application code source 16 is already in the native binary format of the client, such as X86 code that is executed on an IBM-compatible PC client, minimal transformation is required. However, as will be seen below, manager 20 can also be provided with a compiler to transform source code text format of a programming language into native binary code, a code transformation engine to translate code from one binary format to a native binary format used by the client, or a virtual machine (VM) just-in-time (JIT) compiler to convert VM code into a native binary format used by the client.

Server code segment manager 22 is coupled to application code transformation manager 22 and network 16. Manager 22 is responsible for providing binary code segments derived from application code source 18 to client 14.

Within client 14, application launch interface 24 represents an interface that allows an application to be launched. Interface 24 represents methods of launching applications known in the art, such as clicking on an icon to start an application, launching a helper application from a web browser, a batch file that launches a series of applications, or any other method of launching an application known in the art. In the prior art, when an application is launched, typically a file containing native code is loaded into memory, and execution begins at the entry point of the application in memory. In contrast, in the present invention, when interface 24 seeks to launch an application, interface 24 signals client code segment manager 26.

Client code segment manager 26 is coupled to application launch interface 24, code cache linker and manager 28, code cache 30, and native instruction execution unit 32. When interface 24 signals manager 26 to begin executing an application, manager 26 first determines whether the code segment containing the entry point of the application is in code cache 30. If it is, control passes to the code segment in code cache 30 and unit 32 begins executing the code segment. If the segment is not in code cache 30, client code segment manager 26 requests the code segment from server code manager 22 of server 12, receives the code segment, and passes the code segment to code cache linker and manager 28. As discussed above, client code segment manager 26 may also request all segments comprising the application, with the segments being locked in code cache 30 to allow the application to be executed when a network connection to server 12 is not present.

Code cache linker and manager 28 is coupled to code cache 30. Manager 28 links the segment with any other segment stored in code cache 30, and emits the segment into code cache 30. Manager 28 also performs various maintenance functions, such as removing old segments from code cache 30 and optimizing the code segments and locking and unlocking segments, as will be described in greater detail below. After the segment is emitted into code cache 30, control passes to the entry point of the code segment in code cache 30, and unit 32 executes the code segment.

The code segments in code cache 30 are executed by unit 32 until a branch is taken to a code segment not in code cache 30. When this branch was emitted into cache 30, the target address of the branch was altered to pass control back to client code segment manager 26. Manager 26 requests the code segment containing the target address from server 12, server 12 transmits the needed code segment to client 14, code cache linker and manager 28 links the newly received code segment into code cache 30, and native execution continues with the newly received segment in code cache 30.

When executing code segments, at least a portion of code cache 30 must exist in memory that is coupled to native instruction execution unit 32 to allow unit 32 to natively execute the code segments. However, in some configurations it is desirable to also have code cache 30 include persistent forms of storage to allow code segments to be stored when client 14 is powered down or placed in a standby mode. Storing code segments in persistent storage minimizes the need to request retransmission of code segments from server 12 when client 14 is powered up or exits standby mode. For example, if client 14 is a computer system, it is desirable to configure code cache 30 to include a disk cache that stores code segments. Similarly, if client 14 is a personal digital assistant (PDA), it may be desirable to configure code cache 30 to store code segments on a flash memory card. Of course, when the code segments are to be executed, the code segments must be loaded into memory from the persistent storage media. If client 14 has a virtual memory manager, code segments can be loaded from persistent storage by the operating system when a page fault is generated, as is known in the art. Of course, other methods can be used to move code segments between memory and persistent storage. On the other hand, client 14 need not have persistent storage media, since the code segments can be loaded from server 12 whenever the code segments are needed.

The mechanism used by the present invention to manage code segments is similar to a mechanism disclosed in a paper entitled "Transparent Dynamic Optimization" by Vasanth Bala, Evelyn Duesterwald, and Sanjeev Baneijia, which was published in HP Labs Technical Report HPL-1999-77 in June, 1999, a paper entitled "Transparent Dynamic Optimization: The Design and Implementation of Dynamo" by Vasanth Bala, Evelyn Duesterwald, and Sanjeev Banerjia, which was published in HP Labs Technical Report HPL-1999-78 in June, 1999, and a paper entitled "Dynamo: A Transparent Dynamic Optimization System" by Vasanth Bala, Evelyn Duesterwald, and Sanjeev Banerjia, which was published in the Proceedings of the Association for Computing Machinery Special Interest Group on Programming Language's Conference on Programming Language Design and Implementation, 2000, pp. 1-12. These three papers are hereby incorporated by reference.

These three papers describe a dynamic optimization scheme called Dynamo. Basically, Dynamo begins execution by interpreting native binary code. While interpreting the code, Dynamo identifies "hot" code segments and identifies certain optimization opportunities. The "hot" code segments are then optimized and emitted into a segment cache, where the "hot" code segments are natively executed. Rarely executed code segments continue to be executed by interpretation. Accordingly, an application is executed by Dynamo using a mixture of native execution and interpretation. In the present invention, the techniques used to manage the code segments are similar, but are tailored to support execution in a client and server configuration.

As mentioned above, the granularity of the code segments can be easily adjusted to balance server-side and client-side execution and network bandwidth efficiency, and client-side storage requirements. Of course, the smallest possible code segment is a single binary instruction. However, many instructions do not branch, and execution continues with the next instruction in the sequence. Therefore, one implementing the present invention would typically never select single instruction granularity.

For all practical purposes, the smallest code segment size that one implementing the present invention would choose is a basic block of instructions. A basic block is a set of instructions bounded by either branch instructions or entry points. Accordingly, instructions in a basic block are always executed as a group starting with an entry point or an instruction after a first branch instruction and ending with an instruction associated with a second branch instruction. Basic block level granularity is still quite small. In typical binary code, on average there is a branch instruction every 5 or 6 instructions. Accordingly, one implementing the present invention may choose to use a larger code segment granularity. Alternatively, server code segment manager 22 of server 12 can start by using basic block granularity, and increase the code segment size as basic blocks that tend to be executed together are identified. The larger code segments can then be optimized using the techniques from the Dynamo optimization scheme discussed above. Also, the code segment size can be adjusted on a per-client basis to balance server-side and client-side execution overhead and network bandwidth efficiency, and the storage resources of the individual client.

Figure 2A:
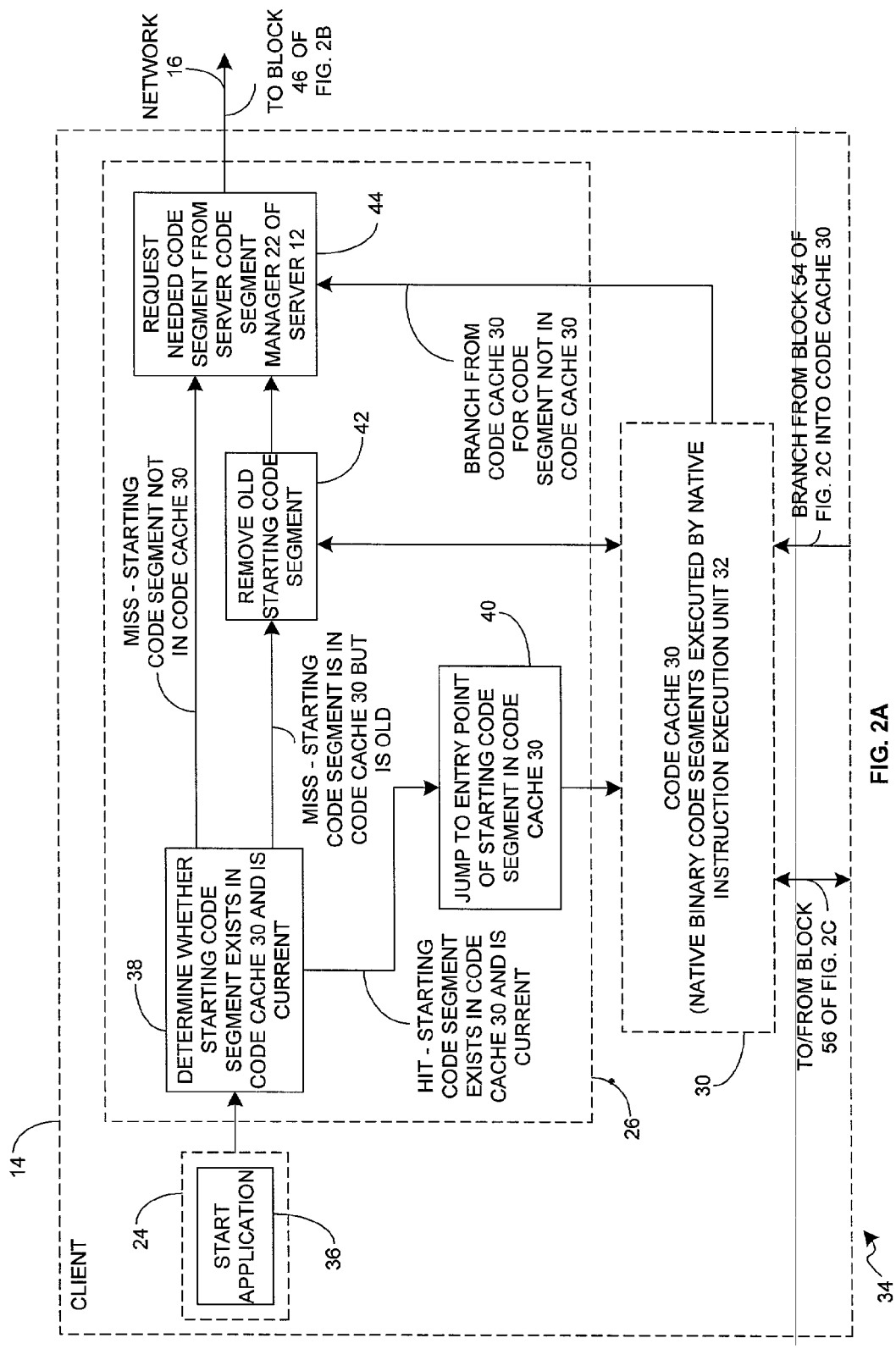
FIGS. 2A, 2C, and 2B, taken together, are a flow diagram that illustrates how an application is executed in accordance with the present invention.
Figure 2B:
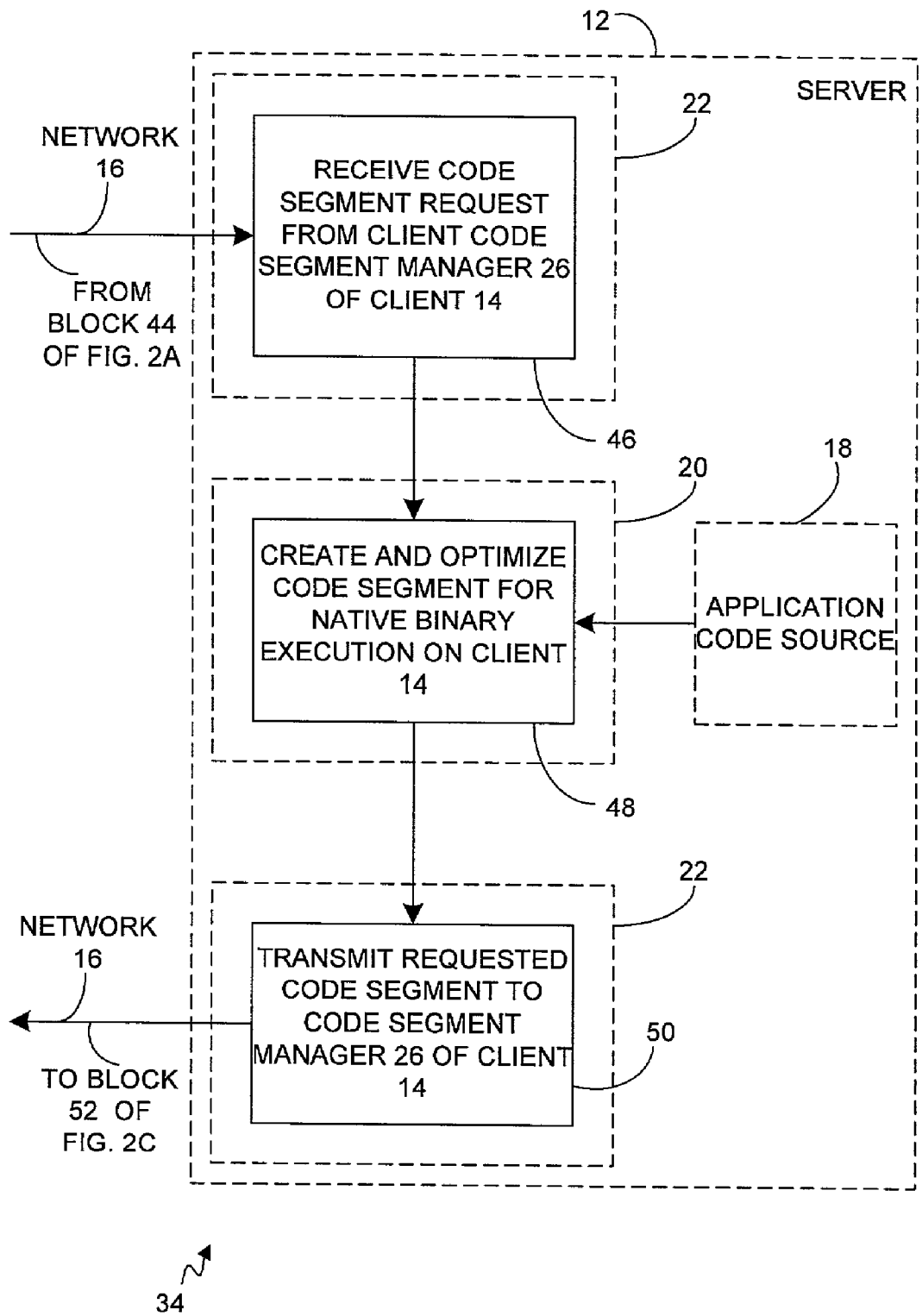
Figure 2C:
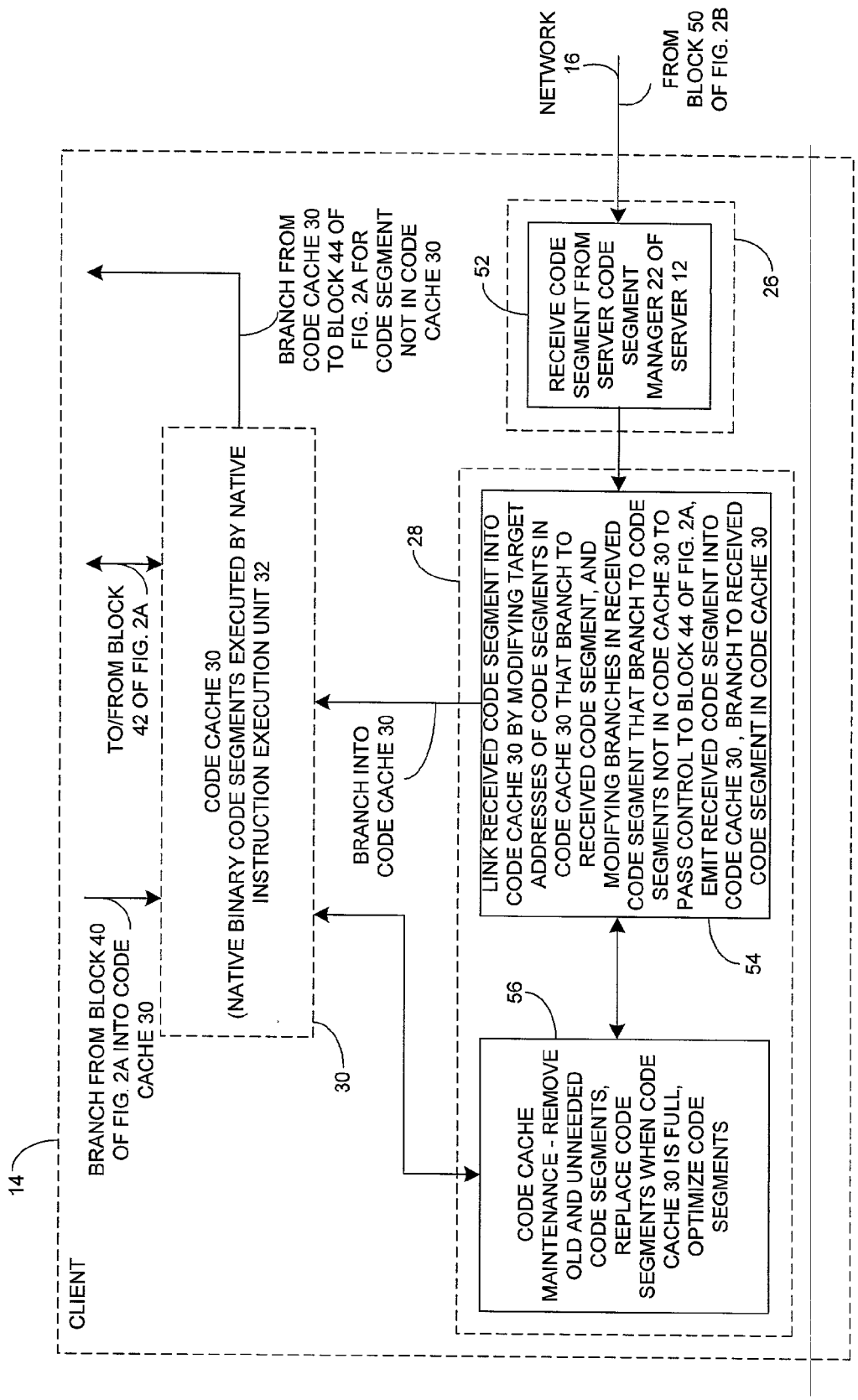

FIGS. 2A, 2C, and 2B, taken together, are a flow diagram 34 that illustrates how an application is executed in accordance with the present invention. In diagram 34, the solid-line blocks depict the steps required to execute the application. The dotted-line boxes correspond to the similarly labeled boxes in FIG. 1 and illustrate where the steps are performed.

Beginning with FIG. 2A, block 36 represents the start of application execution in client 14. Control then passes to block 38, which determines whether the code segment containing the entry point of the application exists in code cache 30, and if it exists, whether the code segment is current. The determination of whether the code segment is current can occur in a number of ways. The whole application or individual code segments can be tagged with an expiration value. If the application or individual code segments have expired, than new code segments can be requested from server 12. Alternatively, block 38 can communicate with server 12 to determine whether the application or individual code segments are current.

Block 38 represents an important feature of the present invention in that block 38 provides the present invention with the scalability and performance attributes of the download and install model, and the application code maintenance attributes of the virtual machine model and the server execution model. Specifically, if the application is current, has been executed previously, and code cache 30 is large enough, the first code segment will be in code cache 30. Accordingly, the application will begin to execute natively as if it had been downloaded and installed. On the other hand, if the code segment is not present in cache 30 or is not current, the latest version of the code segment will be retrieved from server 12, thereby pushing the burden of application management to server 12, as in the virtual machine and server execution models.

If the first code segment is in cache 30 and is current, the "HIT" branch is taken to block 40. Block 40 in turn jumps to the entry point of the starting code segment in cache 30. Thereafter, execution unit 32 of client 14 executes the application from code cache 30 until a branch instruction is executed that has a target that is not in code cache 30. As will be discussed below, the target of this branch will have been adjusted to jump out of code cache 30 and request the needed code segment at block 44.

Now assume that the first code segment is in code cache 30, but is not current. In this situation, the lower "MISS" branch is taken to block 42. Block 42 is coupled to code cache 30 and removes the old code segment from cache 30. Note that the function performed by block 42 can also be performed by code cache maintenance block 56 of FIG. 2C, as will be described below. After the old code segment has been removed from code cache 30, control passes to block 44. Returning to block 38, if the first code segment is not present in cache 30, the upper "MISS" branch is taken directly to block 44.

Block 44 requests the needed code segment from server 12 via network 16. The discussion immediately above illustrated how an application is launched. Accordingly, the term "first code segment" was used. However, block 44 can also be reached when a branch instruction in code cache 30 that seeks to branch to a target code segment not in cache 30 is executed. Accordingly, the terms "needed code segment" and "received code segment" will be used below in appropriate contexts. Of course, if block 44 has been reached from block 38 or 42, the terms "needed code segment" and "received code segment" are equivalent to the term "first code segment".

Server 12 needs to know which application is being executed, as well as the native binary format required by client 14. Assuming that this information has already been provided to server 12 via a prior initialization dialog, the request could be as simple as providing server 12 with the target address that client 14 is seeking to execute. Control then passes to block 46 of FIG. 2B.

In FIG. 2B, block 46 receives the request from client code manager 26 of client 14 via network 16. Control then passes to block 48, which creates and optimizes a code segment from application code source 18 for native binary execution on client 14. As will be discussed in greater detail below, application code source 18 can be ASCII source code, a native code format (either in the format required by client 14 or another format), or a virtual machine format. Also, as discussed above, the granularity of the code segments can be dynamically tailored to balance server-side and client-side execution and network bandwidth efficiency, and client-side storage requirements, and can be optimized based on predicted code segment usage or prior code segment usage history. Control then passes to block 50, which transmits the requested code segment to client code segment manager 26 of client 14 via network 16. Control then passes to block 52 of FIG. 2C.

While code cache 30 is shown in both FIGS. 2A and 2C to better illustrate the present invention, there is only a single instance of code cache 30 in flow diagram 34 of FIGS. 2A, 2B, and 2C. In FIG. 2C, block 52 receives the code segment from server code segment manager 22 of server 12 via network 16. Next control passes to block 54. Block 54 links the received code segment into code cache 30, emits the code segment into code cache 30, and branches to the received code segment in cache 30.

To link the received code segment with the code segments already in code cache 30, block 54 must modify the targets of branch instructions. First, consider the branch targets or branch instructions that are currently in code cache 30. Before the new code segment was received, any branch targets in code segments stored in code cache 30 that need to branch to the newly received code segment had been previously adjusted to branch out of code cache 30 to block 44 to request the needed code segment. Now that this code segment will be in code cache 30, the targets of these branch instructions must be adjusted to branch to the appropriate locations within the received code segment.

Next, consider the branch targets of branch instructions in the newly received code segment. Any branch instructions having branch targets in the newly received code segment that branch to code segments currently in code cache 30 need to be adjusted to branch to the appropriate code segments in cache 30. Furthermore, any branch instructions having branch targets in the newly received code segment that branch to code segments not in code cache 30 need to be adjusted to branch out of code cache 30 to block 44 to request the code segment containing the desired target address.

After the branch targets have been adjusted, the received code segment is emitted into code cache 30, control passes to the received code segment, and native instruction execution unit 32 executes the received code segment (and possibly other code segments) until a branch instruction is reached that needs to branch a code segment not currently in code cache 30. As discussed above, this branch instruction will have been adjusted to pass control to block 44 to retrieve the needed segment from server 12. To adjust branch instruction targets as described above, code cache linker and manager 28 maintains a table of branch instructions and branch targets.

Note that when block 54 attempts to link and emit the newly received code segment into code cache 30, cache 30 maybe fill. In this situation, block 54 signals code cache maintenance block 56 to remove unneeded or old code segments. Typically, block 56 will use a replacement algorithm to determine which code segments are eligible for replacement. Block 56 may, also operate independently of block 54 to maintain a certain amount of free space in code cache 30 by continuously removing old or unneeded code segments.

One replacement algorithm known in the art is the least recently used (LRU) algorithm. Using the LRU algorithm, the segments which have not been used for the longest period of time are replaced first. However, it is also possible to have block 54 use a more sophisticated approached to manage the segments in code cache 30. In one approach, block 50 periodically profiles the execution to better understand the relative importance and shape of the application "hot paths" using the same techniques as Dynamo, which was discussed above. By profiling the execution of code in code cache 30, it is possible to make predictions of the future execution paths of the application based on previous history, and consequently make better decisions about which segments to replace. Of course, this approach incurs a certain amount of overhead.

Another approach (which is the opposite in philosophy) attempts to minimize the cache management overhead by periodically flushing the whole cache whenever the number of replacements reaches a certain threshold. This method is very simple, and effectively captures program "epochs" (completely different application phases that each use a different set of code segments).

As mentioned above, it may be desirable to have client 14 lock all or a portion of the native binary code segments comprising an application in code cache 30 to ensure that the application can continue executing in the event that the network connection to server 12 is temporarily unavailable. In one of the examples discussed above, a user can request that all segments comprising an application be loaded into code cache 30 and locked. In this example, application launch interface 24 of FIG. 1 can present the user with this option, block 44 of FIG. 2A can request all segments from server code segment manager 22 of server 12, and block 28 of FIG. 2C can set a "lock bit" associated with each segment as the segments are emitted into code cache 30. In another example discussed above, an application may request that certain segments of the application be locked in code cache 30, such as all the application segments and data needed to guide an automobile driver from a present location to a destination. In this example, block 44 of FIG. 2A can be provided with an application program interface (API) to allow the application to request that certain segments be loaded into code cache 30 and locked.

If the present invention is provided with the ability to lock segments in code cache 30, then code cache maintenance block 56 of FIG. 2C will manage the locked segments. In one configuration, block 56 can manage the locked segments as part of the cache replacement scheme. For example, block 56 could retain all locked segments until cache 30 becomes full by replacing unlocked segments first, and then replacing locked segments using a replacement algorithm, as discussed above. Alternatively, block 56 could generate a warning to the user indicate that no new applications can be launched until cached and locked applications are explicitly unlocked. Note that block 56 can also be provided with an API to allow an application to unlock segments that are no longer needed. In the example above, when the driver reaches the destination the on-line map application can signal block 56 to unlock all segments that were used to guide the driver to the destination.

In the discussion above, note that native binary code segments are stored in code cache 30. However, segments containing data can also be stored in code cache 30, as in the on-line map application example discussed above. Those skilled in the art will appreciate that the techniques disclosed herein can easily be extended to include data segments as well. To appreciate how this can be done, consider three different types of data "objects" that are commonly used by an executing application.

The first type of data object is data that is statically compiled along with the application. To handle this type of data object, client code segment manager 26 can be provided with a data cache manager that manages data segments in cache 30. Basically, when an application is launched, the CPU is configured to generate a page fault when an attempt is made by the application to access regions of memory in which the application expects data to be stored. These page faults are serviced by the data cache manager, which loads the data segments from the server, stores the data segments in cache 30, and maps the application data accesses to regions in cache 30. Note that these functions can be provided using functions similar to those provided by a virtual memory manager. When cache 30 has reached a certain threshold for data segments, dirty segments must either be moved to some other type of storage, or be written back to the server before new data segments can be loaded into cache 30.

The second type of data object is data that is dynamically allocated by the application. In this case, low-level system calls adapted for use with the present invention can be linked to the application by server 12. For example, the Unix function sbrk is called by an application to change the amount of space allocated to a data segment associated with the calling application. Accordingly, a version of the function sbrk customized to allocate memory in client 14 is linked to the application at server 12 before code segments are transmitted to client 14. When this function call is executed by client 14, the client 14 will allocate memory for the data segment. Note that the memory maybe allocated within or outside of cache 30, and a caching policy may be used as discussed above.

The third type of data object relates to data stored in files. One way to handle such objects is to have each application mount its own file system on a "networked block device", with the "networked block device" under control of the data cache manager. Accordingly, an access to a file generates a fault that is serviced by the data cache manager, which in turn loads the file data from server 12 into memory of client 14.

Note that the application (or lower level functions linked to the application) should provide support for the first and second data object types, but application support for the third object type could be provided other mechanisms, such as direct access to networked objects, sharing at the NFS level, or other networked file access mechanisms.

Figure 3:
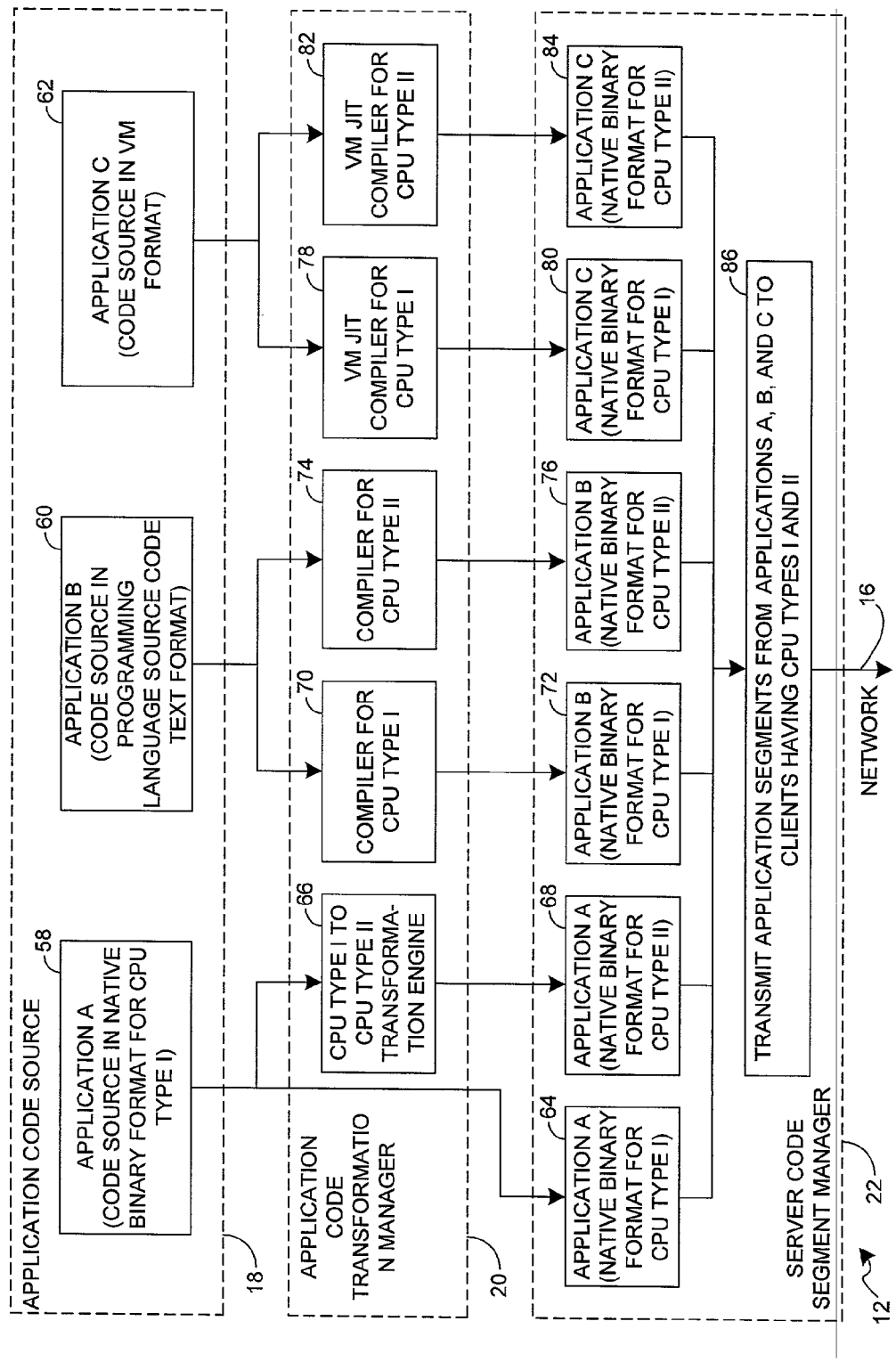
FIG. 3 is a block diagram of the server of FIG. 1 and illustrates how the present invention can manage a variety of application code source formats to facilitate execution on a variety of client CPUs.

FIG. 3 is a block diagram of server 12 and illustrates how the present invention can manage a variety of application code source formats to facilitate execution on a variety of client CPUs. In FIG. 3, two different CPU types are shown, Type I and Type II. For example, the Type I CPU can be an X86 CPU commonly found in Microsoft Windows® compatible desktop computers, and the Type II CPU can be a 32-bit Hitachi SH3 Processor, which is used 4 the Hewlett-Packard Jornada 500 Series of Pocket PCs, or a StrongARM® RISC processor, which is a processor core licensed by ARM® Limited and is used in many embedded devices.

The code sources for the applications are stored in application code source 18. Application A is shown in block 58 and represents an application code source in a native binary format for CPU Type I, such as a legacy X86 application. Application B is shown in block 60 and represents an application code source in the source code text format of a programming language, such as C++. Finally, Application C is shown in block 62 and represents an application code source in a virtual machine format, such as a Java® application.

Application code transformation manager 20 is responsible for transforming each of the Applications A, B, and C into native binary formats for CPU Types I and II, and server code segment manager 22 stores each application in the native binary format for each CPU type. First, consider a client having a Type I CPU and seeking to execute Application A. Since Application A is already in the format required by the client, the code source flows from block 58 through application code transformation manager 20 without transformation to block 64 of server code segment manager 22. Block 64 represents Application A in the native binary format of CPU Type I.

Next consider a client having a Type II CPU and seeking to execute Application A. Application A is not in the native binary format of the client, so the code source flows to block 66 of manager 20, which is a CPU Type I to CPU Type II transformation engine. After the application has been transformed into the native binary format of CPU Type II, the code flows to block 68 of manager 22, which represents Application A in the native binary format of CPU Type II. Transformation engines that translate code from one binary format to another are known in the art. One such transformation engine known in the art is the code morphing software layer present in the Crusoe™ series of processors, which are a product of Transmeta Corporation. Basically, the code morphing software layer of a Crusoe processor is a dynamic translation system that compiles instructions from the X86 instruction set into instructions for a very long instruction word (VLIW) instruction set that is the native instruction set of the inner core of the Crusoe processor. The code morphing software layer of a Crusoe processor is described in greater detail in a paper entitled "The Technology Behind Crusoe™ Processors: Low-Power X86-Compatible Processors Implemented with Code Morphing™ Software" by Alexander Klaiber, which was published in January of 2000. This paper is hereby incorporated by reference.

Next, consider a client that seeks to execute Application B. This application code source is provided in a programming language source code text format, such as C++ source code or Visual Basic® source code. Visual Basic® is a trademark of Microsoft Corporation. If the client has a Type I CPU, the source code flows from block 60 to block 70 of manager 20, which represents a compiler that compiles and links the application into native binary code for CPU Type I. The compiled code then flows to block 72, which represents Application B in the native binary format of CPU Type I. Similarly, if the client has a Type II CPU, the source code flows from block 60 to block 74 of manager 20, which represents a compiler that compiles and links the application into native binary code for CPU Type II. The compiled code then flows to block 76, which represents Application B in the native binary format of CPU Type II.

Finally, consider a client that seeks to execute Application C. This application code source is provided in a virtual machine (VM) format, such as a Java application. If the client has a Type I CPU, the VM code flows from block 62 to block 78 of manager 20, which represents a just-in-time (JIT) compiler that compiles and links the VM application into native binary code for CPU Type I. The compiled code then flows to block 80, which represents Application C in the native binary format of CPU Type I. Similarly, if the client has a Type II CPU, the source code flows from block 62 to block 82 of manager 20, which represents a JIT compiler that compiles and links the VM application into native binary code for CPU Type II. The com piled code then flows to block 84, which represents Application C in the native binary format of CPU Type II.

Note that the steps discussed above can be performed before a client requests a code segment, or upon demand by the client. Block 86 represents server code segment manager 22 transmitting application segments from Applications A, B, and C to clients having CPU types I and II. Block 86 represents the functions performed by blocks 46 and 50 in FIG. 2B.

Figure 4:
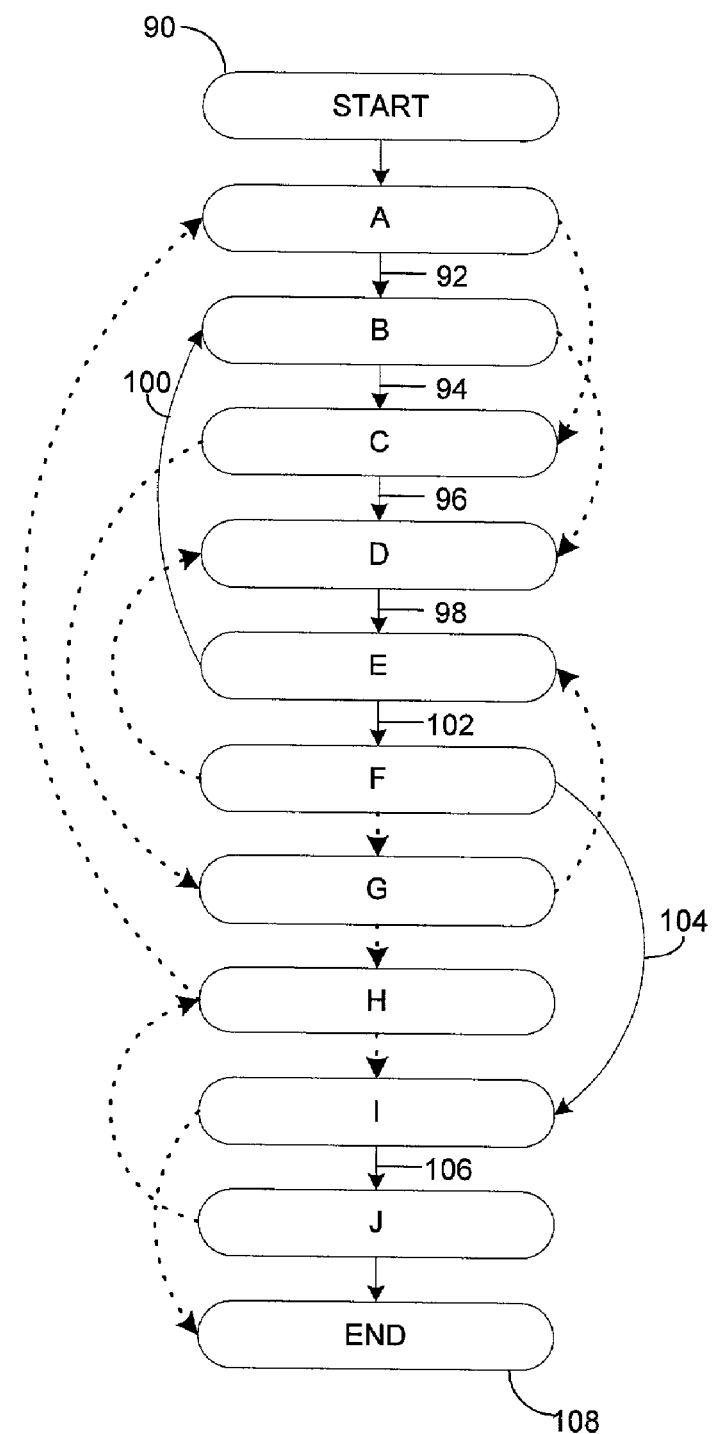
FIG. 4 illustrates an application in the native binary format of the client of FIG. 1 as the application resides on the server of FIG. 1.
Figure 5:
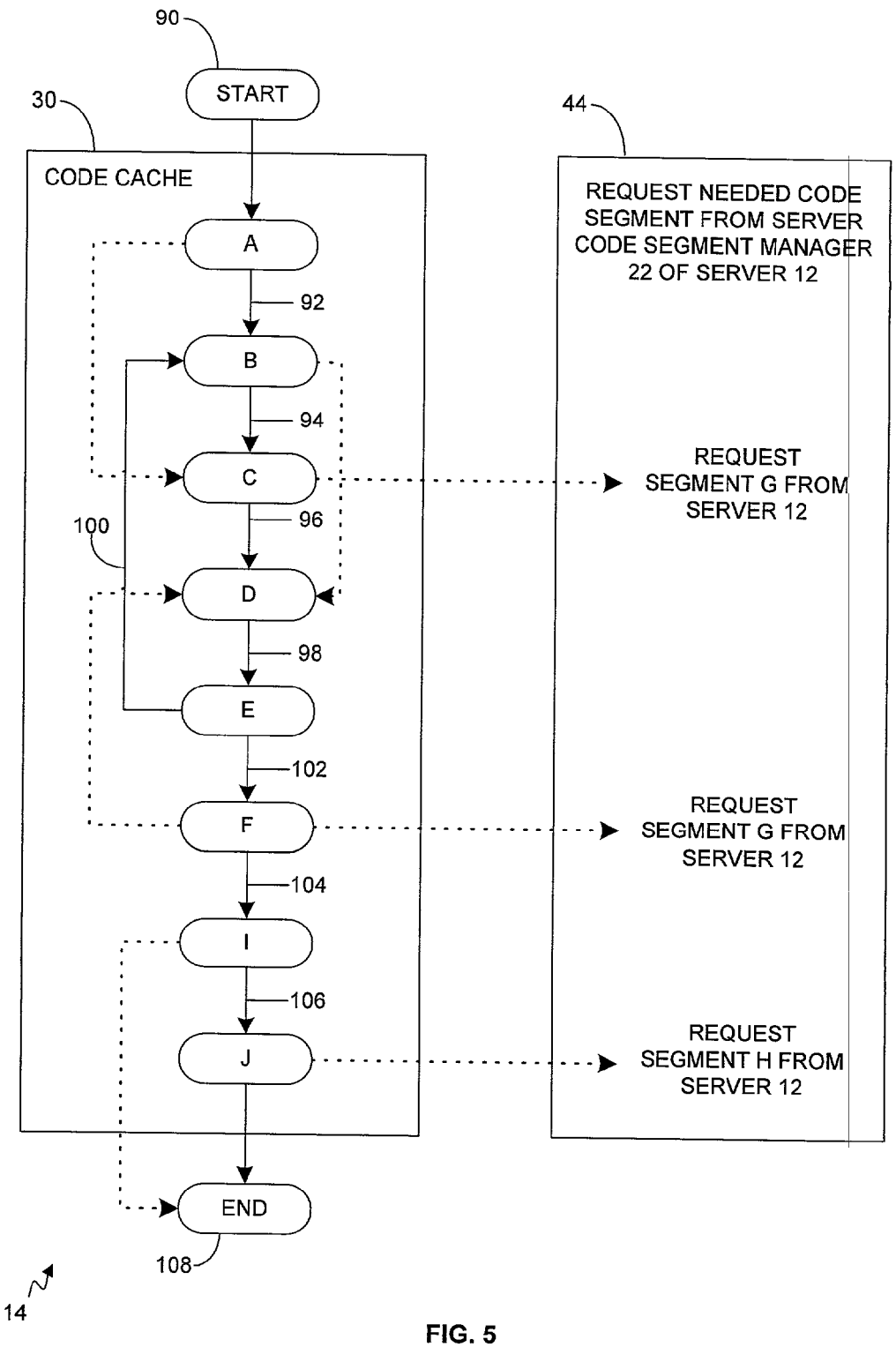
FIG. 5 illustrates code segments stored in a code cache of the client of FIG. 1 after the application of FIG. 4 has finished executing on the client, with the assumption that none of the code segments retrieved from the server have been purged from the code cache.

FIG. 4 illustrates an application 88 in the native binary format of client 14 as application 88 resides on server 12 in server code segment manager 22, and FIG. 5 illustrates the segments stored in code cache 30 of client 14 after application 88 has finished executing on client 14, with the assumption that none of the segments retrieved from server 12 have been deleted from cache 30. In FIG. 4, program 88 comprises segments A, B, C, D, E, F, G, H, I, and J. The lines connecting the segments represent possible execution paths. The solid lines represent execution paths actually traversed by client 14, and the dotted lines represent execution paths not traversed by client 14.

Accordingly, execution begins at block 90, which represents block 36 of FIG. 2A. First, segment A is retrieved from server 12 and is emitted into code cache 30. Note that segment A can flow to segments B or C, so these exit points are adjusted in cache 30 to pass control back to block 44 in FIG. 2A to request the next segment. In this example, path 92 is taken, so segment B is retrieved from server 12. When segment B is emitted into cache 30, path 92 from segment A to B is adjusted to branch to segment B in the code cache. In addition, segment B can flow to segments C or D, so these exit points are adjusted in cache 30 to pass control back to block 44 to request the next segment. This process continues, with path 94 taken to retrieve segment C, path 96 taken to retrieve segment D, and path 98 taken to retrieve segment E.

Segment E can flow to segments B or F. Since segment B is already in cache 30, path 100 is adjusted to flow to segment B in code cache 30, and path 102 is adjusted to pass control back to block 44 to retrieve segment F. Now assume that a loop is executed a number of times through segments B, C, D, and E via paths 100, 94, 96, and 98. This loop will be executed by client 14 from code cache 30 without having to retrieve any additional segments from server 12.

When the loop terminates, path 102 will be taken to retrieve segment F, path 104 will be taken to retrieve segment I, and path 106 will be taken to retrieve segment J. Finally, program execution terminates at end block 108. Note that segments G and H are never executed, and therefore are never transmitted from server 12 to client 14.

FIG. 5 shows the contents of code cache 30 of client 14 after program 88 has finished executing, with the assumption that none of the segments were purged from cache 30. Note that in FIG. 4, segment G can be reached from segments C and F. Since segment G was never loaded into cache 30, segments C and F still have exit points that have been adjusted to pass control to block 44 to retrieve segment G from server 12. Similarly, segment H can be reached from segments G and J. Segment G is not in cache 30. However, segment J still has all exit point that has been adjusted to pass control to block 44 to retrieve segment H from server 12.

Also note that in code cache 30, not only are segments linked by the execution path actually taken, but also by possible execution paths connecting segments in cache 30 that were not taken. Accordingly, the next time client 14 seeks to execute program 88, execution can occur completely from code cache 30 until either segment G or H is needed.

Many of the advantages of the present invention, taken individually, can be found in one of the client-server execution models of the prior art. However, what sets the present invention apart from the prior art is that the present invention combines the best attributes of prior art client-server execution models in a single execution model. Specifically, the present invention is highly scalable since execution occurs on the client. In addition, since execution occurs on the client using native binary code segments stored in a code cache, the present invention is potentially much faster than prior art VM interpreters.

Since code segments can be stored and locked in the code cache of the client, execution can continue if the network connection to the server is temporarily interrupted. As discussed above, applications transmitted to the client are highly resistant to software piracy, making the present invention well suited for pay-per-use business models. In addition, since the application resides on the server, the user is relived of the burden of application management.

The present invention can operate with any type of client CPU. Furthermore, applications can exist on the server in a variety of code source formats, such as a native binary format, a source code text format of a programming language, or a VM code format, thereby allowing the present invention to support legacy applications as well as current and future applications. Accordingly, the present invention is well positioned to provide a valuable client-server execution model capable of working with an ever increasing array of CPU instruction sets and application code formats.

Although the present invention has been described with reference to preferred embodiments, workers skilled in the art will recognize that changes may be made in form and detail without departing from the spirit and scope of the invention.

What is claimed is:

1. A networked system comprising:
   a network;
   a server coupled to the network, wherein the server includes:
      an application code source that stores a client application; and
      a server code manager coupled to the application code source;
         an application code transformation manager coupled to the application code source, for transforming the client application from a first format to a native binary format compatible with a native instruction set of the CPU of the client; and
         a server code segment manager coupled to the application code transformation manager, for parsing the client application in the native binary format into a plurality of code segments, said parsing of said code segments being dynamically performed based on actual server-side and client-side execution overhead, network bandwidth efficiency and client-side storage requirements on a per client basis, and configured based on predicted code segment usage or prior code segment usage history, at least one of said plurality of code segments being transmitted to the client via the network; and
   a client coupled to the network said client not having said client application stored thereon, wherein the client comprises:
      a CPU for natively executing at least one of said plurality of said code segments derived from the client application stored on said server;
      a code cache coupled to the CPU, for storing said code segments; and
      a client code manager coupled to the code cache for launching the client application by requesting that the server code manager transmit at least one of the plurality of dynamically tailored code segments to the client, receiving at least one of the dynamically tailored code segment from the server, storing the dynamically tailored code segment in the code cache, and executing at least one of the plurality of dynamically tailored code segments using the CPU until the executed dynamically tailored code segment attempts to pass control to a required code segment not stored in the code cache, at which point control passes back to the client code manager to retrieve the required code segment from the server, with the CPU continuing execution with the required code segment.

2. The networked system of claim 1 wherein the first format is a native binary format other than the native binary format of the CPU of the client, and the application code transformation manager comprises a transformation engine to transform the client application from the first format to the native binary format of the CPU of the client.

3. The networked system of claim 1 wherein the first format is a source code text format of a programming language, and the application code transformation manager comprises a compiler that compiles and links the client application into a native binary format of the CPU of the client.

4. The networked system of claim 1 wherein the first format is a virtual machine format, and the application code transformation manager comprises a just-in-time compiler that compiles and links the client application into a native binary format of the CPU of the client.

5. The networked system of claim 1 wherein the client code manager comprises:
   a client code segment manager coupled to the network and the code cache, wherein the client code manager requests needed segments from the server; and
   a code cache linker and manager coupled to the code cache and client code cache segment manager, wherein the code cache linker and manager links the code segment received from the server into the code cache, emits the received code segment into the code cache, and branches to the received code segment the code cache.

6. The networked system of claim 5 wherein the code cache linker and manager further comprise:
   adjusting any branch targets in code segments stored in the code cache that need to branch to the received code segment and had previously been adjusted to branch out of the code cache to the client code segment manager to now branch to appropriate locations within the received code segment;
   adjusting any branch instructions in the received code segment having branch targets that branch to code segments currently in the code cache to branch to the appropriate code segments in the code cache; and
   adjusting any branch instructions in the received code segment having branch targets that need to branch to code segments not in the code cache to branch out of the code cache to the client code segment manager to request the code segment containing the branch targets.

7. The networked system of claim 5 wherein the code cache linker and manager includes a code cache maintenance unit coupled to the code cache, for removing old and unneeded code segments from the code cache, replacing older segments with newly received segments when the code cache reaches a certain threshold.

8. A server comprising:
   a network interface that couples the server to a network, which in turn is coupled to a client;
   an application code source that stores a client application; and
   a server code manager coupled to the application code source and the network interface, wherein the server code manager derives native binary code segments in a native execution format required by client CPUs from the application code source, the deriving of the native binary code segments being dynamically performed based on actual server-side and client-side execution overhead, network bandwidth efficiency and client-side storage requirements on a per client basis, and configured based on predicted code segment usage or prior code segment usage history, and transmits at least one of the native binary code segments to said client not having said client application stored thereon upon requests received from said client.

9. The server of claim 8 wherein the server code manager comprises:

an application code transformation manager coupled to the application code source, for transforming the client application from a first format to the native execution format; and a server code segment manager coupled to the application code transformation manager, for parsing the client application in the native execution format into code segments that are transmitted to said client via the network.

10. The server of claim 9 wherein the first format is a native execution format other than the native execution format required by a client CPU, and the application code transformation manager comprises a transformation engine to transform the client application from the first format to the native execution format required by the client CPU.

11. The server of claim 9 wherein the first format is a source code text format of a programming language, and the application code transformation manager comprises a compiler that compiles and links the client application into a native binary format required by a client CPU.

12. The server of claim 9 wherein the first format is a virtual machine format, and the 2 application code transformation manager comprises a just-in-time compiler that compiles and links the client application into a native binary format required by a client CPU.

13. A client comprising:
   a network interface that couples the client to a network, which in turn is coupled to a server;
   a CPU for natively executing code segments derived from the client application stored on the server, wherein the code segments derived from the client application are dynamically tailored by the client application based on actual server-side and client-side execution overhead, network bandwidth efficiency and client-side storage requirements on a per client basis, and configured based on predicted code segment usage or prior code segment usage history;
   a client side code cache coupled to the CPU, for storing code segments; and
   a client code manager coupled to the code cache, wherein the client code manager launches the client application stored on said server and not on said client by requesting that the server transmit at least one of said code segments to the client, receiving at least one of said code segments from the server, storing at least one of said code segments in the code cache, and executing at least one of said code segments using the client CPU until the code segment attempts to pass control to a required code segment not stored in the code cache, at which point control passes back to the client code manager to retrieve the required code segment from the server, with the CPU continuing execution with the required code segment.

14. The client of claim 13 wherein the client code manager comprises:
   a client code segment manager coupled to the network and the code cache, wherein the client code manager requests needed segments from the server; and
   a code cache linker and manager coupled to the code cache and client code cache segment manager, wherein the code cache linker and manager links the code segment received from the server into the code cache, emits the received code segment into the code cache, and branches to the received code segment in the code cache.

15. The client of claim 14 wherein the code cache linker and manager further comprise:
   adjusting any branch targets in code segments stored in the code cache that need to branch to the received code segment and had previously been adjusted to branch out of the code cache to the client code segment manager to now branch to appropriate locations within the received code segment;

adjusting any branch instructions in the received code segment having branch targets that branch to code segments currently in the code cache to branch to the appropriate code segments in the code cache; and adjusting any branch instructions in the received code segment having branch targets that need to branch to code segments not in the code cache to branch out of the code cache to the client code segment manager to request the code segment containing the branch targets.

16. The client of claim 14 wherein the code cache linker and manager includes a code cache maintenance unit coupled to the code cache, for removing old and unneeded code segments from the code cache, replacing older segments with newly received segments when the code cache reaches a certain threshold.

17. A method of executing an application in networked system comprising:

at a client: issuing a code segment request to a server coupled to the client by a network;

at the server: receiving the code segment request from the client;

deriving a plurality of code segments, in a native execution format required by the client, from an application code source stored on said server and not on said client, the code segments being dynamically tailored based on server-side and client-side execution overhead, network bandwidth efficiency and client-side storage requirements, and is configured based on predicted code segment usage or prior code segment usage history;

transmitting at least one of the plurality of code segments to the client;

at the client: receiving at least one of the plurality of code segments;

adjusting branches in at least one of the plurality of code segments having targets not in a code cache of the client to cause code segments containing the targets to be requested from the server;

emitting at least one of the plurality of code segments into the code cache; and executing at least one of the plurality of code segments natively from the code cache.

18. The method of claim 17 wherein deriving a code segment in a native execution format required by the client from an application code source comprises transforming the application source from a native execution format other than that required by the client into the native execution format required by the client.

19. The method of claim 17 wherein deriving a code segment in a native execution format required by the client from an application code source comprises compiling and linking the application code source from a code text format of a programming language into the native execution format required by the client.

20. The method of claim 17 wherein deriving a code segment in a native execution format required by the client from an application code source comprises using a just-in-time compiler to compile the application code source from a virtual machine format into the native execution format required by the client.

21. The method of claim 17 wherein the code segment is a first code segment, and executing the code segment natively from the code cache includes:

at the client: executing a branch in the first code segment that seeks to branch to a second code segment not in the code cache; and issuing a code segment request for the second code segment to the server;

at the server: receiving the code segment for the second code segment from the client; deriving the second code segment in the native execution format required by the client from the application code source; and transmitting the second code segment to the client; and at the client: receiving the second code segment;

adjusting any branches in the first code segment stored in the code cache that need to branch to the second code segment and had previously been adjusted to cause the second code segment to be requested from the server to now branch to appropriate locations within the second code segment; adjusting any branches in the second code segment having targets in the first code segment in the code cache to branch to the appropriate location within the first code segment; adjusting any branches in the second code segment having branch targets in code segments not in the code cache to cause the code segments not in the code cache to be requested by the server emitting the second code segment into a code cache; and continuing execution in the second code segment at the location to which the first code segment attempted to branch.

22. A computer program product, comprising:

at least one computer usable medium having computer readable code embodied therein for causing an application to be executed in a networked system, the computer program product including:

first computer readable program code devices configured to cause a client to issue a code segment request to a server coupled to the client by a network;

second computer readable program code devices configured to cause the server to receive the code segment request from the client, derive a plurality of code segments in a native execution format required by the client from an application code source stored on said server and not on said dent, wherein plurality of code segments are derived dynamically from said application code source based on server-side and client-side execution overhead, network bandwidth efficiency and client-side storage requirements on a per client basis, and transmit at least one of said plurality of said code segments to the client; and third computer readable program code devices configured to cause the client to receive at least one of said plurality of said code segments, adjust branches in at least one of said plurality of said code segments having targets native in a code cache of the client to cause code segments containing the targets to be requested from the serve, emit at least one of said plurality of said code segments into the code cache, and execute at least one of said plurality of said code segments native from the code cache.

23. The computer program product of claim 22 wherein the code segment is a first code segment, and the third computer readable program code devices includes:

fourth computer readable program code devices configured to cause the client to execute a branch in the first code segment that seeks to branch to a second code segment not in the code cache, and issue a code segment request for the second code segment to the server;

fifth computer readable program code devices configured to cause the server to receive the code segment for the second code segment from the client, derive the second code segment in the native execution format required by the client from the application code source, and transmit the second code segment to the client; and sixth computer readable program code devices configured to cause the client to receive the second code segment, adjusting any branches in the first code segment stored in the code cache that need to branch to the second code segment and had previously been adjusted to cause the second code segment to be requested from the server to now branch to appropriate locations within the second code segment, adjust any branches in the second code segment having targets in the first code segment in the code cache to branch to the appropriate location within the first code segment, adjust any branches in the second code segment having branch targets in code segments not in the code cache to cause the code segments not in the code cache to be requested by the server, emit the second code segment into a code cache, and continue execution in the second code segment at the location to which the first code segment attempted to branch.

\* \* \* \* \*

UNITED STATES PATENT AND TRADEMARK OFFICE
CERTIFICATE OF CORRECTION

PATENT NO. : 7,640,153 B2  Page 1 of 1
APPLICATION NO. : 09/874170
DATED : December 29, 2009
INVENTOR(S) : Vasanth Bala et al.

It is certified that error appears in the above-identified patent and that said Letters Patent is hereby corrected as shown below:

In column 18, line 21, in Claim 12, after "the" delete "2".

In column 20, line 23, in Claim 21, after "server" insert -- ; --.

In column 20, line 41, in Claim 22, delete "dent," and insert -- client, --, therefor.

In column 20, line 51, in Claim 22, delete "native" and insert -- not --, therefor.

In column 20, line 53, in Claim 22, delete "serve," and insert -- server, --, therefor.

In column 20, line 56, in Claim 22, delete "native" and insert -- natively --, therefor.

Signed and Sealed this

Twenty-third Day of March, 2010

David J. Kappos
*Director of the United States Patent and Trademark Office*